Dec. 26, 1933. V. A. SCHOENBERG 1,940,772
OIL TESTER
Filed March 30, 1932  2 Sheets-Sheet 1

Inventor
Virgil Adolf Schoenberg.

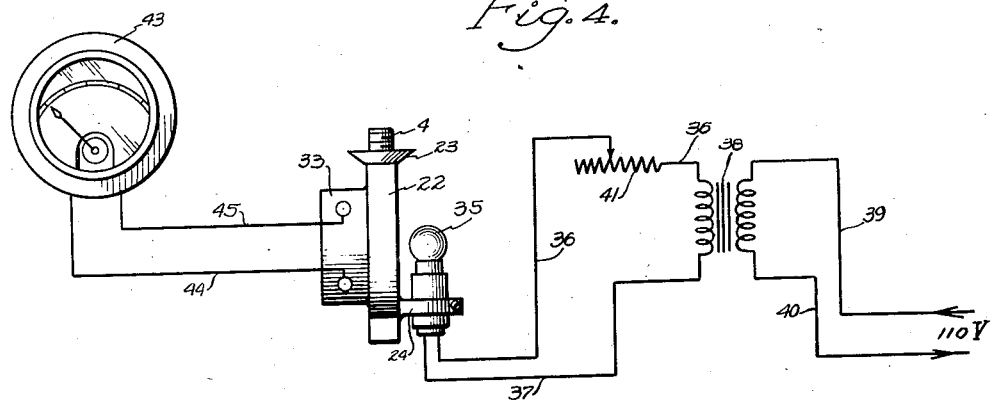

Patented Dec. 26, 1933

1,940,772

UNITED STATES PATENT OFFICE 1,940,772

OIL TESTER

Virgil Adolf Schoenberg, Niles Center, Ill., assignor to Light-Sensitive Apparatus Corporation, Niles Center, Ill., a corporation of Illinois Application March 30, 1932. Serial No. 601,966

4 Claims. (Cl. 88—14)

This invention relates to improved apparatus for determining directly the amount of contamination of oil or the like.

The main objects of this invention are to provide an improved method of directly indicating impurities or suspended matter in lubricating oil; to provide means of measuring the opaqueness of an oil film of predetermined thickness; to provide an improved oil cell for forming an oil film of predetermined depth; to provide such a device with a light sensitive source of electromotive force, an electric indicator, and a source of light; to provide means for adjusting the illumination required to produce full scale deflection through an empty oil film cell; and to provide pressure means for forcing the formation of the oil film in the oil cell.

An illustrative embodiment of this invention is shown in the accompanying drawings, in which:

Fig. 3 is a vertical section of the same taken on line 3—3 of Fig. 1.

Fig. 4 is a diagrammatic sketch of the electric circuits showing one way of obtaining and controlling the source of illumination.

Figure 1:
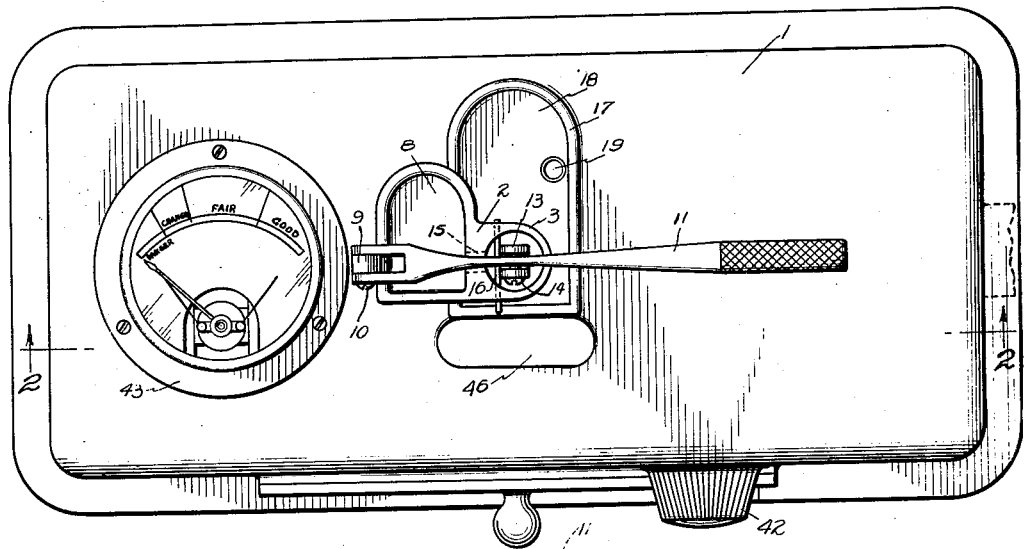
Figure 1 is a top plan view of a light sensitive oil tester.
Figure 2:
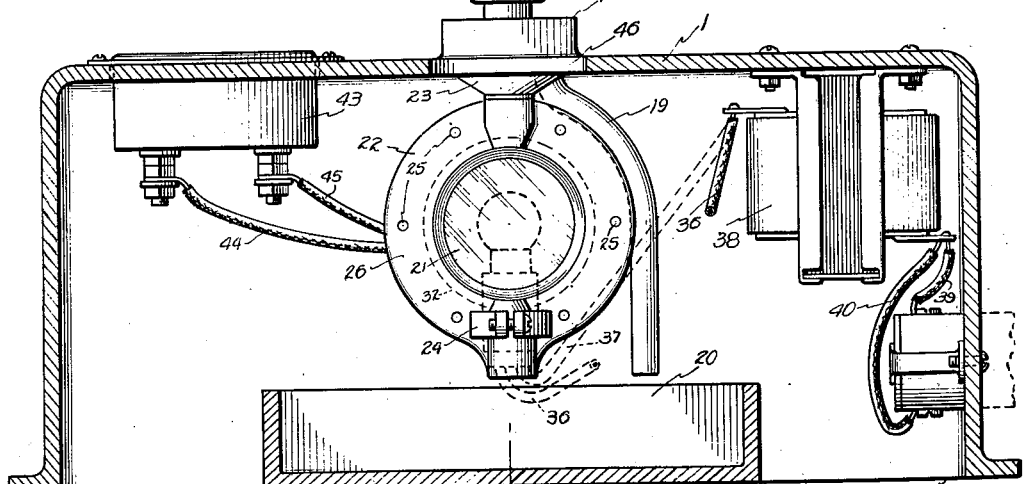
Fig. 2 is a vertical section of the same taken on line 2—2 of Fig. 1.

In the form shown, my improved light sensitive oil tester comprises a casing 1 on which is mounted a force pump 2, having a cylinder 3 threaded on a vertical nipple 4, which is threaded in the casing boss 5, and secured with a gasket 6 and a lock nut 7. Integral with the cylinder 3 is a pump cup 8 having an uprising lug 9, and a pivot 10 on lug 9 carries a lever 11 to which is fastened a plunger 12 by means of a rod 13 and a pivot 14. A port 15 connects the bottom of the cup 8 with the top of the cylinder 3, and a bar 16 limits the upward stroke of the plunger 12. A raised ledge 17 is cast on the casing 1 around the boss 5 forming an overflow sump 18 having an outlet pipe 19 leading to a tray tank 20.

The oil film cell or fluid conductor comprises two circular glass plates 21 which are separated approximately one-hundredth of an inch by a spacer, not shown. The plates 21 are mounted in a bronze casting or casing 22, having integral thereon the nipple 4, a flange bearing 23, and a split lamp support 24. Threaded apertures 25 are also provided and are symmetrically spaced in the glass holding ring 26. A coacting circular bronze casting 27 is secured to one side of the casing 22 and is provided with internally threaded lugs 28 to which a plate 29 is fastened by means of screws 30. In the assembly of the oil film cell the spaced glass plates 21 are placed between two cork gaskets 31 which are seated in the circular recess 32. Then screws threaded in the apertures 25 adjust the tension between the castings 22 and 27.

A photronic cell 33 is held under compression against a circular cork cushion ring 34, seated against the casting 27 at the base of the lugs 28, by means of the plate 29, and an incandescent lamp 35 mounted on the support 24 is positioned on the center line of the oil film cell 22 and the photronic cell 33.

In the apparatus herein shown the lamp 35 is supplied with current by leads 36 and 37 connected to a transformer 38 which is fed through leads 39 and 40. Connected in the lead 36 is a rheostat 41 with a control knob 42. In an aperture in the top of the case 1 is installed a micro-ammeter 43 which is connected to the terminals of the photronic cell 33 by leads 44 and 45. A window 46 in the casing permits observation of the oil film.

In operation, light from the lamp 35 falling upon the face of the photronic cell 33 causes an electric current to be generated within the cell and actuate the indicator or pointer of the micro-ammeter 43. This current is proportionate to the intensity of the light from the lamp or source 35 and the degree of actuation or movement of the micro-ammeter pointer will show the relative value of such light intensity as compared to a predetermined base or index.

A full scale deflection of the micro-ammeter 43 is obtained by controlling the illumination from the lamp 35 by means of the rheostat 41 in the lamp circuit. After obtaining exactly full scale deflection with no oil film between the glass plates 21, a sample of oil, about one-half a wine glass, is poured into the pump cup 8 and permitted to drain into the pump cylinder 3 while the plunger 12 is in its upper position. A downward stroke of the plunger forces the oil to form a film between the plates 21, which can be seen through the casing window 46.

When the film is formed its opaqueness will decrease the intensity of the light falling upon the photronic cell, and the deflection of the needle on the micro-ammeter will be less than full scale. Based on careful oil analysis the meter scale may be divided into several divisions to indicate the condition of the oil. In the form shown the divisions are good, fair, change and danger, and as the impurities in the oil increase the amount of light penetrating the film becomes more and more obscure. When the percentage of light obscurity is high and the ammeter deflection low, the indication is that the oil has completed its usefulness, is full of carbon, or other impurities, and is dangerous to the life of the friction surfaces on which it is used.

In the case of internal combustion engines, the time required to change oil from good to bad indicates the condition of the engine in which it is used. Should the oil tests show a high carbon or impurity content on comparatively short runs, they show either faulty piston ring fit or other engine defects which cause the oil to become rapidly contaminated. Each car or engine, depending on its condition and wear, has its own oil mileage, and this device determines accurately the mileage value for each car. Also the use of my improved oil testing device eliminates the arbitrary procedure of changing the oil after a specified number of miles of operation of an automobile regardless of whether or not the oil is still in good condition.

Other conditions cause the oil to become contaminated, such as road dust and dirt, sulphuric acids, water globules and chemical changes of oil structure due to heat, friction and dilution, and the use of my device permits the detection of these conditions which would otherwise not be apparent in a cursory examination.

When oil of high viscosity is used and is permitted to become contaminated with foreign substances, the abrasion caused by these particles is increased materially due to the oil's viscosity characteristics which maintain these particles in suspension longer and prevent precipitation. It is obvious that when oils retain hard abrasive substances, damage to wearing surfaces will result. Should this condition be permitted to increase beyond a reasonable percentage then the film of oil that is forced through the bearings is greatly reduced as to lubricating qualities because the larger percentage of this film is composed of foreign substances and only a small percentage of the film is composed of oil.

Adding oil to oil that is already contaminated does not increase the lubricating value to any material percentage. Its only action is to cause a relative separation of the particles in suspension. It has been found in extensive laboratory research that the percentage of contamination of oil as used in motor cars is practically a straight line function when plotted against engine mileage, and the increase in contamination is in direct proportion to the increase of the engine mileage.

By consistent sampling and testing of the crank case oil by my improved device the dangers of progressive contamination are greatly reduced and it is possible to know at all times the exact lubricating and cooling results that can be expected from the oil in use. Thus the life of the engine is considerably prolonged and the cost of maintenance is greatly reduced.

Although but one specific embodiment of this invention has been herein shown and described, it will be understood that certain details of the construction shown may be altered or omitted without departing from the spirit of this invention as defined by the following claims.

I claim:

1. A device for determining the lubricating quality of oil, comprising a fluid conductor having transparent walls spaced a predetermined distance apart and arranged to form a fluid film of predetermined thickness, said conductor having an entrance and an oppositely disposed exit, a light sensitive source of electromotive force positioned opposite one of said transparent walls, a light source disposed opposite the other of said transparent walls, and indicating means actuated by said source of electromotive force and calibrated to indicate the lubricating quality of oil passing through said fluid conductor.

2. In a device for determining the lubricating quality of oil, a fluid conductor comprising a casing having transparent side walls spaced a predetermined distance apart and arranged to form a film of oil passing therethrough, said casing having an entrance and an opposed exit, each communicating with the space between said side walls, a photronic cell secured to said casing and opposite one of said side walls, a light source secured to said casing opposite the other of said walls, a micro-ammeter calibrated to indicate the lubricating quality of the oil passing through said fluid conductor, and electric conductors interconnecting said micro-ammeter and said photronic cell.

3. A device for indicating the lubricating quality of oil comprising a light sensitive source of electromotive force having an indicator electrically connected thereto for actuation by such electromotive force, an oil container having transparent opposed faces spaced apart to admit a film of oil therebetween, means to force oil between said conductor faces, and a light source arranged to direct rays of light through the faces of said conductor and onto said source of electromotive force, said indicator being calibrated in zones representing the quality of lubrication obtainable from the oil in said container.

4. A device for determining the lubricating quality of oil, comprising a fluid conductor having transparent walls spaced a predetermined distance apart and arranged to form a fluid film of predetermined thickness, a light sensitive source of electro-motive force positioned opposite one of said transparent walls, a light source disposed opposite the other of said transparent walls, and indicating means actuated by said source of electro-motive force and calibrated to indicate the lubricating quality of oil passing through said fluid conductor.

VIRGIL ADOLF SCHOENBERG.